United States Patent [19]

Hotomi

[11] Patent Number: 4,828,369

[45] Date of Patent: May 9, 1989

[54] ELECTROCHROMIC DEVICE

[75] Inventor: Hideo Hotomi, Suita, Japan

[73] Assignee: Minolta Camera Kabushiki Kaisha, Osaka, Japan

[21] Appl. No.: 54,873

[22] Filed: May 27, 1987

[30] Foreign Application Priority Data

| May 28, 1986 | [JP] | Japan | 61-124343 |
| Jun. 11, 1986 | [JP] | Japan | 61-135559 |
| Jun. 18, 1986 | [JP] | Japan | 61-143841 |

[51] Int. Cl.$^4$ ............................ G02F 1/01; G02F 1/17
[52] U.S. Cl. .................................................... 350/357
[58] Field of Search ........................ 350/357, 355, 356

[56] References Cited

U.S. PATENT DOCUMENTS

| 4,432,612 | 2/1984 | Nicholson et al. | 350/357 |
| 4,456,337 | 6/1984 | Nicholson | 350/357 |

FOREIGN PATENT DOCUMENTS

| 80304653.1 | 3/1981 | European Pat. Off. . | |
| 57-120919 | 7/1982 | Japan . | |
| 58-30731 | 2/1983 | Japan . | |
| 58-37623 | 3/1983 | Japan . | |
| 58-40531 | 3/1983 | Japan . | |
| 58-57113 | 4/1983 | Japan . | |
| 58-98722 | 6/1983 | Japan . | |
| 59-135431 | 8/1984 | Japan . | |
| 2183435 | 8/1987 | Japan | 350/357 |
| 2204239 | 9/1987 | Japan | 350/357 |

Primary Examiner—Eugene R. LaRoche
Assistant Examiner—Nathan W. McCutcheon
Attorney, Agent, or Firm—Burns, Doane, Swecker & Mathis

[57] ABSTRACT

An electrochromic device, comprising, a first transparent electrode, an electrochromic layer, a macromolecular solid electrolyte layer and a second electrode, each applied successively is disclosed. The electrochromic device is characterized in that the macromolecular solid electrolyte layer is a plasma polymerization film which includes a hydrocarbon compound, an alkali metal and an element having large electronegativity. An electrochromic device, comprising, a transparent electrode, an electrochromic material made from an organic material of the ion injection type, an ionic conductor layer, and a second electrode, each applied successively is disclosed. The electrochromic layer is a film which is made with a plasma polymerization process of a phthalocyanine compound under the supply of carrier gas at a low frequency between 1 kHz and 3 MHz of alternating electric field.

8 Claims, 3 Drawing Sheets

ELECTROCHROMIC DEVICE

BACKGROUND OF THE INVENTION

1. Field of the Invention

The present invention relates to an electrochromic device (hereinafter referred to as ECD) which is applicable to a display device, an optical shutter, an active color filter or the like and, in particular, to an ECD which is produced with a plasma polymerization process.

2. Description of the Prior Art

An ECD is used for a solid-state passive display the color of which is changed when positive or negative charges are injected thereto. It comprises a coloring layer of the above-mentioned material and a layer of ionic conductor, which are interposed between two opposing electrodes.

The materials used as an ionic conductor layer are classified into three groups: liquid electrolytes, solid electrolytes and dielectrics. In an ECD which makes use of a liquid electrolyte such as sulfuric acid or lithium perchlorate/propylene carbonate, a complete sealing structure against the liquid is needed in order to prevent leakage or freezing of the liquid, so that its usage is limited. On the contrary, an ECD of all solid type which makes use of a solid electrolyte, especially a macromolecular solid electrolyte not only solves the above-mentioned problem, but also can be used in a wide temperature range, with a high reliability, and further can be driven easily by a matrix drive means (for example, U.S. Pat. No. 4,456,337). Thus, an ECD of all solid type has been developed.

The solid electrolyte used in an ECD of all solid type can be classified into three kinds: a ionic conductor of metallicions or a material wherein metallic ions are dispersed, a ferrodielectric film, and a macromolecular solid electrolyte. Especially, macromolecular solid electrolytes have been attracted attention and have been studied because of excellent shapability.

An ECD of all solid type which uses Nafion (registered trade mark of a polymer ion-exchange resin of perfluorosulfonic acid which owned by du Pont chemicals) as an electrolyte layer has already been developed. However, Nafion can be prepared in a form of a thin film only down to 250 $\mu$m. Further, the response time of Nafion is very slow to an order of about one second because $H^+$ ions absorbed in macromolecules need a long time to migrate therethrough. An ECD of all solid type which makes use of a mixed macromolecular solid electrolyte is reported to have the contrast and the response time of the same orders of those of an ECD liquid electrolyte type. The mixed macromolecular solid electrolyte is a material which is prepared by mixing an electrolyte with Teflon powder and a white pigment and by compacting the mixed material.

On the other hand, an ECD which makes use of a macromolecular complex solid electrolyte has also been developed (for example, Japanese Patent laid open publication Nos. 40531/1983 and 135431/1984.) The macromolecular complex solid electrolyte is prepared by dispersing an inorganic salt and/or a plasticizer in a macromolecular polymer. The addition of the plasticizer makes ions to migrate very easily so that the electrolyte operates effectively as a solid electrolyte in an ECD. An ECD which uses this type of electrolyte has the response time of for example 0.2 sec and the contrast of almost the same order as those of a prior art ECD of liquid electrolyte type, while it has excellent shapability. Thus, it can be used in various uses.

Further, an ECD which makes use of an organic solid electrolyte film has also been proposed in order to improve the operation characteristics of ECD (for example, Japanese Patent laid open publication No. 30731/1983.). The ECD of this type is advantageous, from a viewpoint of the production thereof, in that it is easy to be produced that a variety of ECDs can be produced according to needs thereof and that the production cost can be reduced.

The coloring layer of an ECD can be composed of either one of two types of electrochromic (EC) materials: an inorganic compound and an organic compound. Among inorganic compounds, some inorganic compounds of translation metals, especially $WO_3$, have been developed for an coloring layer. However, an EC material of transition metal oxide shows only one color generally, and the tone of color is not necessarily clear. Accordingly, it is hard to display a full color image. On the contrary, EC materials of organic compounds are known to be superier in the property of coloring.

EC materials of organic compounds can be classified with respect to the coloring mechanism into a reversible electrodeposition type and an ion injection type. As an EC material which belongs to the former type, there are known viologen dyes and anthraquinone dyes, while tetrathiafluvalene (TTF) and rare earth diphthalocyanines (U.S. Pat. Nos. 4,432,612 and 4,456,337) are known as an EC material of the latter type. A deposition film of rare earth diphthalocyanines, for example, of lutetium diphthalocyanine changes its color from red through orange, green, blue to violet according to the applied electric voltage in a range between $+1.5$ V to $-1.5$ V. Thus, multicoloring can be realized by using one kind of EC materials of the latter type, so that it is hopeful that a multicoloring ECD can be commercialized practically.

However, there remain many problems to be solved for a practical use. Especially, such problems have been pointed out that the repetition life is short, that the response rate is slow and that the contrast is low.

As for the repetition life, each of the EC layer, the electrodes and the electrolyte is caused to deteriorate, respectively, and the life is of an order about $10^7$ repetitions at maximum in a practical level. If the repetition life is improved to an order of $10^8$, the ECD of this type will be utilized in a variety of uses, so that the repetition life of an order of $10^8$ is a target level to be attained. It is made clear that the deterioration of the EC layer is caused by the capture and storage of alkali metallic ions of the electrolyte layer (regardless of a liquid or a solid) in the EC layer in the process of repeated going in and out of the ions of the EC layer. It is also one of reasons which cause the deterioration that Joule heat generated by an electric current applied upon the driving accelerates a chemical reaction so that a color deposition is caused in the EC layer to make the coloring dull.

As to the slow response rate, it is known that the response rate can be improved for organic EC materials down to several tens msec (for example 50–100 msec). However, the response rate of 10 msec is required to be attained for a practical use. The slowness of the response may be ascribed to the slowness of the mobility in the electrolyte layer. It is also affected by the dimension of the contact area between the electrolyte layer and the coloring layer.

As to the low contrast, the coloring density can be made higher by increasing a voltage to be applied. However, this makes the repetition life short and causes the display electrodes to deteriorate. Therefore, in a view point of practical use, it is not appropriate to increase the voltage to be applied. The increase in the porosity of an EC film is also one of solutions for improving the contrast, and the increase in the deposition pressure is effective for the increase in the porosity. However, this lowers the mechanical strength of the EC film due to the electrochemical reaction between the EC electrode and the electrolyte, so that the life becomes short. In other words, chemical changes such as elution and deposition of the electrolyte layer become large as far as the electrolyte layer is arranged in an ECD.

SUMMARY OF THE INVENTION

It is a general object of the present invention to provide an improved ECD.

It is another object of the present invention to provide an ECD which has an excellent repetition life, response rate and contrast.

It is still another object of the present invention to provide an excellent ECD which has a macromolecular solid electrolyte layer of high qualities.

It is a further object of the present invention to provide an ECD which has a coloring layer of excellent qualities.

It is a still further object of the present invention to provide an ECD of excellent properties realized with the use of a plasma polymerization process.

An electrochromic device according to the present invention comprises a first transparent electrode, an electrochromic layer, a macromolecular solid electrolyte layer and a second electrode, each applied successively, being characterized in that the macromolecular solid electrolyte layer is a plasma polymerization film which includes a hydrocarbon compound, an alkali metal and an element having large electronegativity.

Another electrochromic device, according to the present invention, comprises a transparent electrode, an electrochromic material made from an organic material of the ion injection type, an ionic conductor layer, and a second electrode, each applied successively, wherein said electrochromic layer is a film which is made with a plasma polymerization process of a phthalocyanine compound under the supply of carrier gas at a low frequency between 1 kHz and 3 MHz of alternating electric field.

An advantage of a first ECD according to the present invention is that an ECD can be provided for a practical use which is produced by using an electrolyte layer of a plasma polymerization film made from hydrocarbon compounds which include an alkali metal and an element of large electronegativity. That is, the ionic mobility is improved, the deposition of color at the interface with the EC layer can be prevented effectively, the response rate becomes fast and the repetition life becomes long.

An advantage of a second ECD according to the present invention is that the coloring reaction becomes fast because a very fine network structure of the coloring layer is realized due to the plasma polymerization which makes the electrolyte ions to inject into the coloring layer easily.

Another advantage of the second ECD according to the present invention is that the coloring layer itself is firm due to the polymerization so that the deposition of the color caused by the repetition of the coloring is reduced considerably and the repetition life is made longer.

An advantage of the second ECD according to the present invention is that the coarsening of the interface between the coloring layer and the electrolyte layer makes the contact area between them increase so that the repetition life and the contrast are improved and the response rate of an EC layer is improved largely.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DETAILED DESCRIPTION OF THE EMBODIMENTS

Figure 1:
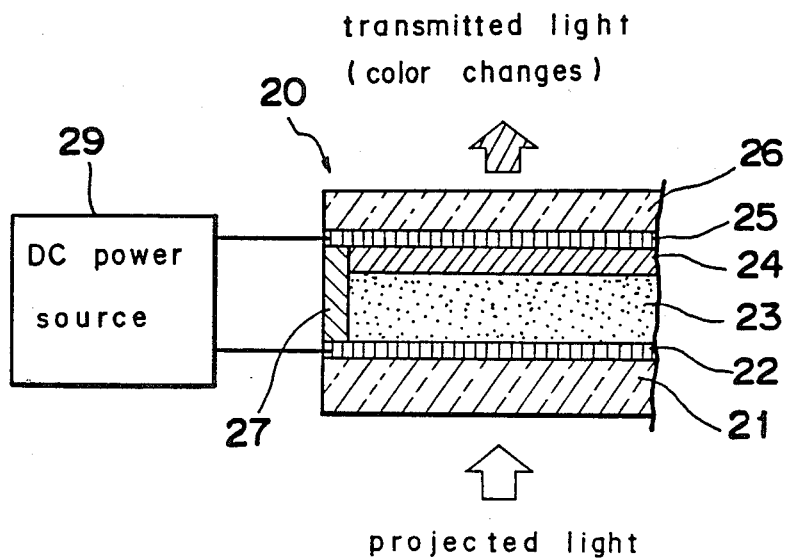
FIG. 1 is a schematic partial cross-section of an electrochromic display device of an embodiment of the present invention.

Referring now to the drawings wherein like reference characters designate corresponding parts throughout several views, FIG. 1 shows a schematic cross-sect of an electrochromic display device 20 of an embodiment according to the present invention. An indium-tin-oxide (ITO) electrode film 22 is applied on a glass substrate 21 or a NESA glass substrate. Then, a macromolecular electrolyte layer 23 is formed on the ITO electrode film 22 by a plasma polymerization process which will be explained below in detail. An EC layer 24 is an tungsten oxide ($WO_3$) layer deposited on the macromolecular electrolyte layer 23 with use of a vacuum deposition process. Then, another substrate 26 having another ITO electrode film 25 applied thereon is arranged so as to contact the ITO film 25 to the EC layer 24. A spacer 27 is arranged at the side of the ECD 20 between both ITO electrode layers 22, 25. A direct-current electric power supply 29 which is able to change the polarity of the electric voltage to be supplied is connected between the electrodes 22, 25.

The macromolecular solid electrolyte layer 23 is a plasma polymerization film of a hydrocarbon compound which includes an alkali metal and an element having a large electronegativity. The element having a large electronegativity can be fluorine, oxygen, nitrogen or chlorine, or can be either one of them being included in an organic polar group, and the element acts on ions of an alkali metal such as $Li^+$, $Na^+$, $K^+$ or the like and makes them attract thereto electrostatically. The element having a large electronegativity can be an element which forms a group in the plasma polymerization film such as an oxygen in an ether group.

Examples of materials being desirable for including alkali metal atoms in the plasma polymerization film, wherein the alkali metal denotes either one of lithium, sodium, potassium, rubidium, and cesium, are as follows:

(a) The above-mentioned alkali metal.

They are vaporized by heating them on a boat because they are in the solid state.

(b) Organometallic compounds

Methyllithium, lithium acetylide-ethylenediamine complex, n-butyllithium, sec-butyllithium, tert-butyllithium and phenyllithium.

(c) Metal hydrides

Lithium hydride, lithium aluminium hydride, lithium tri(tert-butoyy)aluminium hydride, lithium borohydride, sodium hydride, sodium bis(2-methoxyethoxy) aluminium hydride, sodium borohydride, sodium cyanoborohydride, potassium hydride and potassium borohydride.

(d) Metal azides and amides

Lithium azide, sodium azide, lithium amide, sodium amide, lithium diisopropylamide, lithium dicyclohexylamide, and lithium dicyclohexylamide, and lithium bis(trimethylsilyl)amide.

(e) Alkoxides.

Lithium methoxide, sodium methoxide, sodium ethoxide, potassium methoxide, potassium tert-butoxide and potassium tert-butylate.

(f) Other metallic compounds

Sodium Hexachlororhodate (III) dihydrate, potassium tetrachloropalladate (II), sodium hexachloroiridate (IV) hexahydrate, sodium hexachloroiridate (III) dihydrate and potassium hexafluorophosphate.

Alkali metal acrylates, alkali metal methacrylates and alkali metal phthalocyanines are also included.

Examples of materials being usable for including an element having a large electronegativity, wherein the element is either one of halogen elements, that is, fluorine, chlorine, bromine and iodine, oxygen, sulfur and nitrogen are as follows. The element is preferably either one of fluorine, chlorine, oxygen and nitrogen, and it acts so as to attract alkali metal ions such as $Li^+$, $Na^+$ or $K^+$ in a plasma polymerization film.

(a) Halogens and halides

Fluorine, chlorine, bromine and iodine.

Inorganic halides such as hydrogen fluoride, chlorine fluoride, bromine fluoride, iodine fluoride, hydrogen chloride, bromine chloride, iodine chloride, hydrogen bromide, iodine bromide and hydrogen iodide.

Organic halides such as alkyl halides, aryl halides including halogenated styrenes, polymethylene halides, haloforms, halogenosilicic acid esters, halogen-substituted organosilanes and alkylmetal halides.

In detail, the alkyl halide includes, for example, methyl fluoride, methyl chloride, methyl bromide, methyl iodide, ethyl fluoride, ethyl chloride, ethyl bromide, ethyl iodide, propyl fluoride, propyl chloride, propyl bromide, propyl iodide, butyl fluoride, butyl chloride, butyl bromide, butyl iodide, amyl fluoride, amyl chloride, amyl bromide, amyl iodide, hexyl fluoride, hexyl chloride, hexyl bromide, hexyl iodide, heptyl fluoride, heptyl chloride, heptyl bromide and heptyl iodide.

The aryl halide includes, for example, fluorobenzene, chlorobenzene, bromobenzene, iodobenzene, chlorotoluene, bromotoluene, chloronaphthalene and bromonaphthalene.

The halogenated styrenes include, for example, chlorostyrene, bromostyrene, iodostyrene and fluorostyrene.

The polymethylene halide includes, for example, methylene chloride, methylene bromide, methylene iodide, ethylene chloride, ethylene bromide, ethylene iodide, trimethylene chloride, trimethylen bromide, trimethylene iodide, butane dichloride, butane dibromide, butane diiodide, pentane dichloride, pentane dibromide, pentane diiodide, hexane dichloride, hexane dibromide, hexane diiodide, heptane dichloride, heptane dibromide, heptane diiodide, octane dichloride, octane dibromide, octane diiodide, nonane dichloride and nonane dibromide.

The haloform includes, for example, fluoroform, chloroform, bromoform and iodoform.

The halogenosilicic acid ester includes, for example, monomethoxy trichlorosilane, dimethoxydichlorosilane, trimethoxy monochlorosilane, monoethoxy trichlorosilane, diethoxydichlorosilane, triethoxymonochlorosilane, monoaryloxytrichlorosilane, diaryloxydichlorosilane and triaryloxymonochlorosilane.

The halogen-substituted organosilane includes, for example, chloromethyltrimethylsilane, dichloromethyltrimethylsilane, bischloromethyltrimethylsilane, trischloromethylmethylsilane, chloroethyltriethysilane, dichloroethyltriethylsilane, bromomethyltrimethylsilane, iodomethyltrimethylsilane, bisodomethyldimethylsilane, chlorophenyltrimethylsilane, bromophenyltrimethylsilane, chlorophenyltriethylsilane, bromophenyltriethylsilane and iodophenyltriethylsilane.

The alkylmetal halide includes, for example, dimethyl aluminium chloride, dimethylaluminium bromide, diethylaluminium chloride, diethylaluminum iodide, methylaluminum dichloride, methylaluminum dibromide, ethylaluminum diiodide, trimethyltin chloride, trimethyltin bromide, trimethyltin iodide, triethyltin chloride, triethyltin bromide, dimethyltin dichloride, dimethyltin dibromide, dimethyltin diiodide, diethyltin dichloride, diethyltin dibromide, diethyltin diiodide, methyltin trichloride, methyltin tribromide, methyltin triiodide and ethyltin tribromide.

(b) Oxygen and oxides

Oxygen and inorganic oxides such as ozone, water vapor, carbon monooxide, carbon dioxide and carbon suboxide.

Organic compounds which have a functional group or a coupling such as a hydroxy group (—OH), an aldehyde group (—COH), an acyl group (RCO—, —CRO), a ketone group (>CO), an ether group (—O—), an ester coupling (—COO—), and a heterocyclic ring having an oxygen.

In detail, the organic compound which have a hydroxy group includes, for example, methanol, ethanol, propanol, butanol, aryl alcohol, fluoroethanol, fluorobutanol, phenol, cyclohexanol, benzylalcohol and frufurylalcohol.

The organic compound which has an aldehyde group includes, for example, formaldehyde, acetoaldehyde, propioaldehyde, butylaldehyde, glyoxal, acrolein, benzaldehyde and furfural.

The organic compound which includes an acyl group includes, for example, formic acid, acetic acid, propionic acid, butyric acid, valeric acid, palmitic acid, stearic acid, oleic acid, oxalic acid, malonic acid, succinic acid, benzoic acid, toluic acid, salicylic acid, cinnamic acid, naphthoic acid, phthalic acid and furanic acid.

The organic compound which has a ketone group includes, for example, acetone, ethylmethylketone, methylpropylketone, butylmethylketone, pinacolone, diethylketone, methylvinylketone, mesityl oxide, methylheptenone, cyclobutanone, cyclopentanone, cyclohexanone, acetophenone, propiophenone, butylophenone, valerophenone, dibenzylketone, acetonaphtone, acetothienone and acetbfurone.

The organic compound which has an ether coupling includes, for example, methyl ether, ethyl ether, propyl ether, butyl ether, amyl ether, ethyl methyl ether, methyl propyl ether, methyl butyl ether, methyl amyl ether, ethyl propyl ether, ethyl butyl ether, methyl amyl ether, ethyl propyl ether, ethyl butyl ether, ethyl amyl ether, vinyl ether, aryl ether, methyl vinyl ether, methyl aryl ether, ethyl vinyl ether, ethyl aryl ether, anisole, phenetole, phenyl ether, benzyl ether, phenyl benzyl ether, naphthyl ether, ethylene oxide, propylene oxide, trimethylene oxide, tetrahydropyran and dioxane.

The organic compound which has an ester coupling includes, for example, methyl formate, ethyl formate, propyl formate, butyl formate, amyl formate, methyl acetate, ethyl acetate, propyl acetate, butyl acetate, amyl acetate, methyl propionate, ethyl propianate, propyl propionate, butyl propionate, amyl propionate, methyl butyrate, ethyl butyrate, propyl butyrate, butyl butyrate, amyl butyrate, methyl valerate, ethyl valerate, propyl valerate, butyl valerate, amyl valerate, metyl benzoate, ethyl benzoate, methyl cinnamate, ethyl cinnamate, propyl cinnamate, methyl salicylate, ethyl salisylate, propyl salicylate, butyl salicylate, amyl salicylate, methyl anthranilate, ethyl anthranilate, butyl anthranilate, amyl anthranilate, methyl phthalate, ethyl phthalate and butyl phthalate.

The organic compound which has a heterocyclic ring having an oxygen includes, for example, furan, oxazole, frazan, pyran, oxazine, morpholine, benzofuran, benzooxazole, chromene, chroman, dibenzofuran, xanthene, phenoxazine, oxolane, dioxolane, oxiatiolane, oxadiazine, and benzoisooxazole.

(c) nitrogen and nitrides

Nitrogen and inorganic nitrides such as ammonia, nitrogen monooxide, nitrogen dioxide, dinitrogen trioxide, dinitrogen pentaoxide and nitrogen trioxide.

Organic nitrides which have a functional group such as an amino group (—$NH_2$), a cyano group (—CN), a nitro group (—$NO_2$), a nitroso group (—NO), an isocyanic ester coupling (—NCO), an isothiocyanic ester coupling (—NCS), an azothioether coouplling (—N=NS—), a peptide coupling (—CONH—) and a heterocyclic ring which has an nitrogen atom.

In detail, the organic compound which has an amino group includes, for example, methylamine, ethylamine, propylamine, butylamine, amylamine, hexylamine, heptylamine, octylamine, cetylamine, dimethylamine, diethylamine, dipropylamine, dibutylamine, diamylamine, trimethylamine, triethylamine, tripropylamine, tributylamine, triamylamine, arylamine, diarylamine, triarylamine, cyclopropylamine, cyclobutylamine, cyclopentylamine, cyclohexylamine, aniline, methylaniline, dimethylaniline, ethylaniline, diethylaniline, toluidine, benzylamine, bibenzylamine, tribenzylamine, diphenylamine, triphenylamine, naphthylamine, ethylenediamine, trimethylenediamine, tetramethylenediamine, pentamethylenediamine, hexamethylenediamine, diaminoheptane, diaminooctane and phenylenediamine.

The organic compound which has a cyano group includes, for example, acetonitrile, propionitrile, butyronitrile, valeronitrile, capronitrile, enanthonitrile, caprylonitrile, phellargonenitrile, caprinitrile, lauronitrile, palmitonitrile, stearonitrile, crotononitrile, malononitrile, succinonitrile, adiponitrile, benzonitrile, tolunitrile, cyanobenzyl cinnamoylnitrile, naphthonitrile and cyanopyridine.

The organic compound which has a nitro group includes, for example, nitrobenzene, nitrotoluene, nitroxylene and nitronaphthalene.

The organic compound which has a nitroso group includes, for example, nitrosobenzene, nitrosotoluene, nitrosonaphthalene and nitrosocresol.

The organic compound which has an isocyanic ester coupling includes, for example, methyl isocyanate, ethyl isocyanate, propyl isocyanate, butyl isocyanate, phenyl isocyanate and naphthyl isocyanate.

The organic compound which has an isothiocyanic ester coupling includes, for example, methyl isothiocyanate, ethyl isothiocyanate, propyl isothiocyanate, butyl isothiocyanate, amyl isothiocyanate, aryl isothiocyanate, phenyl isothiocyanate and benzyl isothiocyanate.

The organic compound which has an azothioether coupling includes, for example, benzenediazothiophenyl ether, chlorobenzenediazothiophenyl ether, bromobenzenediazothiophenyl ether, nitrobenzenediazothiophenyl ether, phenyldiazomercaptonaphthalene, methoxyphenyldiazomercaptonaphthalene, benzenediazothioglycolate, bromobenzenediazothioglycolate and nitrobenzendiazothioglycolate.

The organic compound which have a peptide coupling includes, for example, glycerglopeptide and gluceroid peptide.

The organic compound which has a heterocyclic ring having a nitrogen atom includes, for example, pyrole, pyrroline, pyrrolidine, oxazole, thiazole, imidazole, imidazoline, imidazolidine, pyrazole, pyrazoline, pyrazolidine, triazole, tetrazole, pyridine, piperidine, oxazine, morpholine, thiazine, pyridazine, pyrimidine, pyrazine, piperazine, triazine, indole, indoline, benzooxazole, indazole, benzoimidazole, quinoline, cinnoline, phthalazine, phthalocyanine, quinazoline, quinoxaline, carbazole, acridine, phenanthridine, phenazine, phenoxazine, indolizine, quinolizine, quinuclidine, naphthyridine, purine, pteridine, aziridine, azepine, oxadiazine, dithiazine, benzoquinoline and imidazothiazole.

(d) Sulfides

Hidrogen sulfide, thiophene and known organic compounds which include a sulfur atom.

Examples of materials being usable for including the hydrocarbon in the plasma polymerization film are as follows: saturated hydrocarbons, unsaturated hydrocarbons, alicyclic hydrocarbons and aromatic hydrocarbons.

The saturated hydrocarbon includes, for example, normal paraffins such as methane, ethane, propane, butane, pentane, hexane, heptane, octane, nonane, decane, undecane, dodecane, tridecane, tetradecane, pentadecane, hexadecane, heptadecane, octadecane, nonadecane, eicosane, heneicosane, docosane, tricosane, tetracosane, pentacosane, hexaconane, heptacosane, octacosane, nonacosane, triacontane, dotriacontane and petatriacontane, and isoparaffins such as isobutane, isopentane, neopentane, isohexane, neohexane, 2,3-dimethylbutane, 2-methylbutane, 2-methylhexane, 3-ethylpentane, 2,2-dimethylpentane, 2,4-dimethylpentane, 3,3-dimethylpentane, triptane, 2-methylheptane, 3-methylheptane, 2,2-dimethylhexane, 2,2,5-dimethylhexane, 2,2,3-trimethylpentane, 2,2,4-trimethylpentane, 2,3,3-trimethylpentane, 2,3,4-trimethylpentane and isononane.

The unsaturated hydrocarbon includes, for example, olefins such as ethylene, propylene, isobutylene, 1-butene, 2-butene, 1-pentene, 2-pentene, 2-methyl-1-butene, 3-methyl-1-butene, 2-methyl-2-butene, 1-hexene, tetramethylethylene, 1-heptene, 1-octene, 1-nonene and 1-decene, diolefins such as allene, methylallenne, butadiene, pentadiene, hexadiene and cyclopentadiene, triolefins such as ocimene, alocimene, myrcene, and hexatriene, and others such as acetylene, methylacetylene, 1-butyne, 1-pentyne, 1-hexyne, 1-heptyne, 1-octyne, 1-nonyne and 1-decyne.

The alicyclic compound includes, for example, cycloparaffins such as cyclopropane, cyclobutane, cycrobutane, cyclopentane, cyclohexane, cycloheptane, cyclooctane, cyclononane, cyclodecane, cycloundecane, cyclododecane, cyclotridecane, cyclotetradecane, cyclopentadecane and cyclohexadecane, cycloolefins such as cyclopropene, cyclobutene, cyclopentene, cyclohexene, cycloheptene, cylooctene, cyclononene and cylodecene, terpens such as limonene, terpinolene, phellandrene, sylvestrene, thujene, carene, pinene, bornlene, camphene, fenchene, cyclofenchene, tricyclene, bisabolene, zingiberene, curcumene, humulene, cadinenesisquibenihene, selinene, caryophyllene, cedrene, camphorene, phyllocladene, podocarprene, santarene and mirene, and steroids.

The aromatic hydrocarbon includes, for example, benzene, toluene, xylene, hemimellitene, pseudocumene, mesitylene, prehnitene, isodurene, durene, pentamethylbenzene, ethylbenzene, propylbenzene, cumene, styrene, biphenyl, terphenyl, diphenylmethane, triphenylmethane, dibenzyl stilbene, indene, naphthalene, tetrailin, anthracene, and phenanthrene.

Most of the above-mentioned materials are not in the gas state but in the liquid or solid state at a room temperature under ambient an pressure. However, they can be used if they can be transformed in the gas state by melting, vaporization, sublimation or the like.

Various kinds of combination of the above-mentioned materials are possible, and an appropriate combination can be adopted.

The carrier gas for the plasma polymerization process can preferably be selected among $H_2$, Ar, Ne and He.

The layer 24 of electrochromic material can be either a solid or a resin wherein the electrochromic material is dispersed in a high density. In the former case, the EC layer 24 is preferably made by a plasma polymerization process. Then, both the EC layer 24 and the electrolyte layer 23 can be formed with use of the plasma polymerization process, so that an ECD 20 can be produced with use of the same apparatus or production processes. Therefore, the production method can be simplified.

Figure 2:
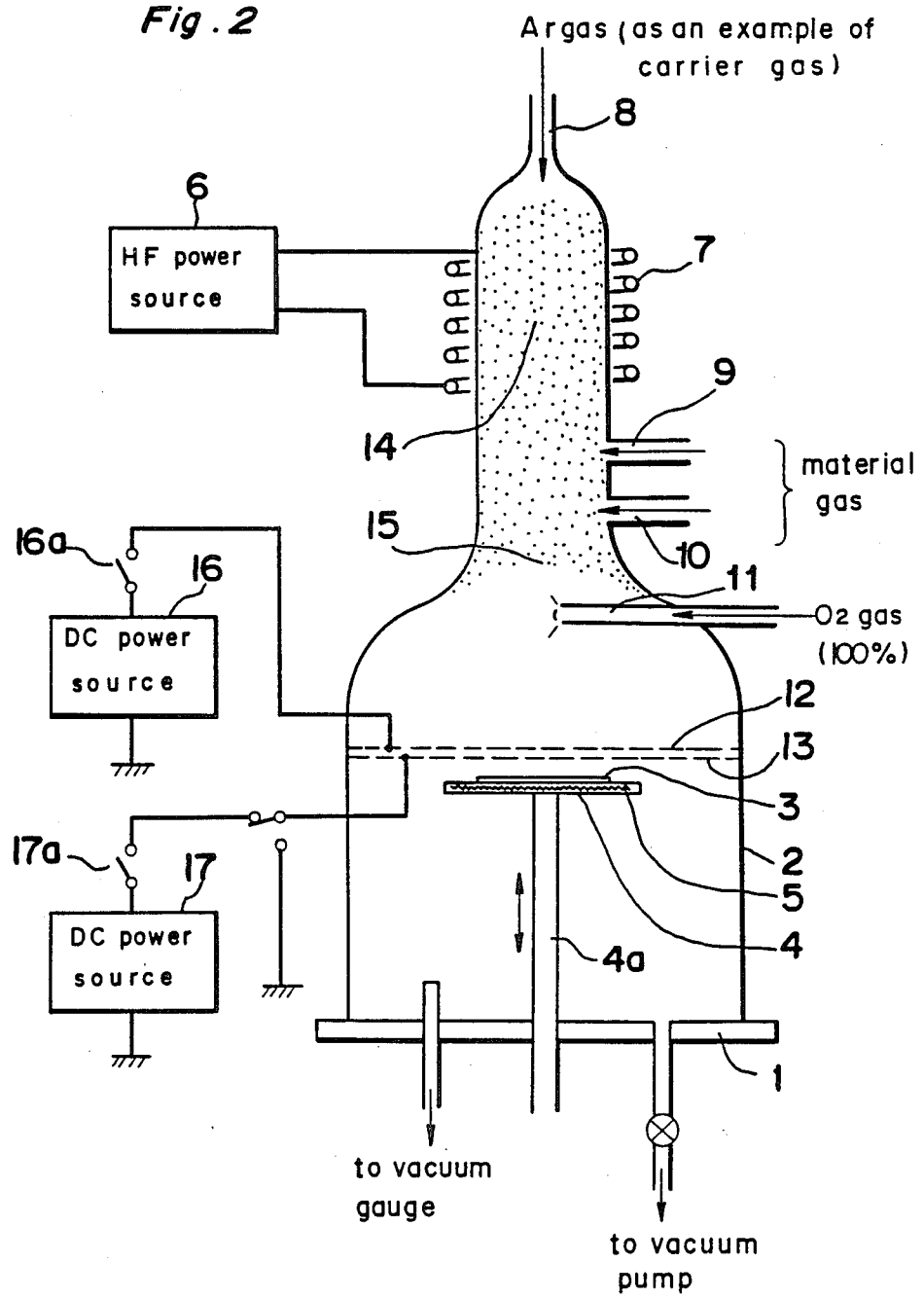
FIG. 2 is a schematic cross-section of a production apparatus of an electrochromic display device.

FIG. 2 shows a schematic sectional view, illustrating an apparatus for producing an ECD of an embodiment according to the present invention. On a base plate 1, a bell jar 2 is put airtight. The air in the bell jar 2 can be evacuated with a vaccum pump not shown, and the degree of vacuum is measured with a vacuum gauge not shown.

A substrate holder 4 on which a substrate 3 for an ECD is put has a supporting rod 4a, which is engaged with the base plate 1 so as to be able to slide up and down. Therefore, the position of the substrate 3 can be changed in the vertical direction. The substrate holder 4 has a heater 5 for heating the substrate 3 so that the temperature of the substrate 3 can be kept constant, if necessary, by operating an external temperature controller not shown. A temperature sensor not shown for detecting the temperature of the substrate 3 is arranged in a predetermined position of the substrate holder 4. Further, a water-cooling apparatus (not shown) is installed for the substrate holder 4 in order to cool the substrate 3 if necessary.

Around the upper part of the bell jar 2 having a small diameter, there is arranged a high-frequency coil 7 which is connected to an radio-frequency electric power source 6. The high-frequency coil 7 makes the introduced gas into the plasma state by the electromagnetic induction. The high-frequency coil 7 has a pipe not shown in which cooling water circulates.

Carrier gas is introduced through a gas inlet 8 provided at the top of the bell jar 2. Material gas for a film to be formed on the substrate 3 is introduced through three gas inlets 9, 10, 11 provided in the middle portion of the bell jar 2. The source of the material gas can be gas, liquid or solid of a monomer material or hydrocarbon of methane series. In the case of liquid or solid, it can be vaporized under a reduced pressure by controlling the temperature with a temperature controller so as to generate the vapor thereof. In this preferred embodiment, the material gases for principal components of a film to be formed are introduced through the first and second gas inlets 9, 10, while a gas to be blended is introduced through the third gas inlet 11. Of course, a monomer gas which includes oxygen may be introduced through the third gas inlet 11.

In FIG. 2, the third gas inlet 11 is represented in such a manner that the top edge thereof locates at the center of the bell jar 2 for the convenience of the explanation. Practically, the gas is introduced in a direction perpendicular to the surface of the paper on which FIG. 2 is drawn, in order to mix the gases well and to avoid possible unevenness of a film to be formed.

The reason why three gas inlets 9, 10, 11 are provided at different hights is to change the distance between the discharge electrode or the high frequency coil 7 and the introduction part of the material gas. The life of a free radical or an active specy or ion can be controlled by changing the distance, so that the structure or the properties of the film to be formed can be varied. That is, the kinds of the species deposited on the substrate can be selected by changing the distance, so that the composition and the structure of the film or the properties of the film can be varied. As mentioned above, the substrate holder 4 is constructed so as to allow it to move vertically up and down. Thus, the number of radicals which reach the substrate 3 can be controlled by changing the height of the substrate holder 4. Therefore, the combination of both types of control makes it possible to produce a film having optimal properties.

Two metallic plates of mesh electrodes 12, 13 having a predetermined distance between them are arranged in parallel to the substrate holder 4 between the substrate holder 4 and the third gas inlet 11, the lowest among the gas inlets 9–11, in the bell jar 2. A DC. voltage of $+V_b$ can be applied by a DC power source 16 connected to the upper mesh electrode 12, while the earth voltage or a DC voltage of $-V_b$ can be applied by another DC power source 17 connected to the lower mesh electrode 13. The mesh electrodes 12, 13 act as grids to collect and capture electrons and charged particles in the plasma and to prevent plasma bombardment.

Electrodes other than the mesh electrodes of opposite polarities, for example, an electric conductive filter which has a number of minute holes can also be used as the grid. However, mesh electrodes are most suitable since there is not any fear of plugging of holes. Further, mesh electrodes more than two can be set in order to improve and control the capture. The size of meshes of the electrodes is preferably 8 mm square, or more preferably 1-4 mm square. If the size exceeds 8 mm square, electrons or charged particles are liable to leak from the apertures of the mesh electrodes, so that the effect to allow only radicals (neutral species) to reach the substrate 3 reduces considerably. On the contrary, if the size is less than 1 mm square, charged particles adhere the mesh holes so as to reduce the number of radicals to reach the substrate 3 or to decrease the deposition rate considerably.

An example of the production of a macromolecular electrolyte layer 23 on an ITO electrode film 22 formed on a NESA glass substrate 21, as shown in FIG. 2, will be explained in the following:

Plasma is generated in conditions of 0.9 Torr of pressure (absolute pressure, measured with a vacuum gauge of diaphram type), 13.56 MHz of radio frequency, and 80 W of electric power.

Argon gas is introduced through the gas inlet 8 for the carrier gas at the rate of 40 cc/min (at room temperature). Monomers of n-bytyl lithium ($CH_3(CH_2)_3Li$) diluted with hexane solution by 65% are introduced through the gas inlet 9 for a material gas at the rate of about 10 cc/min. (Instead of n-butyl lithium, sodium methylate ($CH_3Na$) diluted with methanol by 65% can be used also.) Monomers of methyl methacrylate (MMA) are introduced through the gas inlet 10 at the rate of about 50 cc/min. And, 100% $O_2$ gas as the gas for blending is supplied through the gas inlet 11 at the rate of about 1.5 cc/min. Instead of $O_2$, $N_2O$ may be used as the gas for blending.

When the switches 16a, 17a for applying the voltages are turned on, bias voltages of $+V_b$ and $-V_b$ are applied to the mesh electrodes 12, 13 at the same time.

The substrate 3 is made of a glass on which a conductive transparent film of indium tin oxide (ITO) is formed, that is, a NESA glass. The temperature of the substrate 3 is kept at about 100° C. It should be noted that the heater 5 and the water cooling apparatus mentioned above are not operated. The substrate 3 can be heated up to about 100° C. from a room temperature (about 30° C.) due to the energy of the plasma. If the temperature of the substrate 3 becomes high anomalously due to the energy of plasma, the water cooler is operated so as to lower the temperature.

The monomers of n-butyl lithium have a molecular weight of 64.06 and the boiling point of 80°–90° C. They are disolved in n-hexane ($CH_3(CH_2)_4CH_3$), and the solution is bubbled by Ar gas. The solution is kept at a constant temperature with an electronic temperature controller of circulation type in order to supply monomers vaporized at a constant vapor pressure into the bell jar 2.

Then, a film of a polymer of macromolecule having ether groups is deposited on the NESA glass 3 at the deposition rate of about 7 $\mu$m/h. In this embodiment, a film of thickness about 20 $\mu$m is prepared.

The introduced Ar gas is transformed in the plasma state with the discharge electrode 7. The Ar plasma 14 activates n-butyl lithium gas, MMA gas and $O_2$ gas with the activation energy of the Ar plasma 14 so as to transform the gases in the plasma state. The plasma gas 15 of the latter gases includes radicals, ions, activated atoms and molecules, and electrons. Negative charges are captured and collected with the mesh electrode 12 of positive bias voltage. Further, ions of positive charges are captured with the mesh electrode 13 of negative bias voltage. Thus, only neutral radicals and neutral activated atoms and molecules pass through both mesh electrodes 12, 13.

An apparatus with no mesh electrodes, wherein the substrate is separated from the plasma, can deposit a film surely without destroying the structure of material gas and without deteriorating the characteristics of material gas. However, such an apparatus needs an increase in electric power to some extent in order to keep an appropriate deposition rate. Such an increase in the applied electric power makes the plasma expand near the substrate so as to cause plasma damage. Though the deposition rate is enhanced, the decomposition of the deposited film also proceeds so that the properties of the film deteriorate in proportion to the decomposition. Further, such disadvantages occur that lithium atoms are not dispersed into the film well and that the bridging proceeds too fast to disperse lithium atoms well into the film. On the contrary, the adoption of both mesh electrodes 12, 13 makes it possible to eliminate almost all species which cause plasma damage. Thus, only nentral excited species such as neutral radicals contribute to the deposition, and it becomes possible that a film of desired properties can be produced at a deposition rate appropriate for a commercial use.

Material gas may be introduced through either of the gas inlets 9, 10. In this embodiment, the distance 5 between the two gas inlets 9, 10 is set to be about 2 cm. It is found that the properties of a film is better if material gases of n-butyl lithium and MMA are mixed and introduced through the gas inlet 10 which locates near the end to the Ar plasma. Thus, it seems better that the material gas is not transformed directly into the plasma, but is excited indirectly by that Ar plasma and that the excitation is made smooth. Accordingly, it is supposed that the material gas deposites on the substrate mainly due to the gradual polymerization or the diffusion of radicals (neutral species) and that the effects of the bombardment is extremely small, if any, so that the properties of a film as a polymer solid electrolyte are improved.

The material gas introduced through the gas inlet 10 may be mixed further with $O_2$ gas. If required by the selection of the conditions, all the above-mentioned mixed gas can be introduced through the gas inlet 11 for the gas for blending.

Thus, a macromolecular electrolyte layer 23 is formed with use of the plasma polymerization process on a glass substrate 21 on which the ITO electrode film is formed. As shown in FIG. 2, an EC layer 24 is formed in this embodiment by the vacuum deposition of tungsten oxide $WO_3$ on the macromolecular electrolyte layer 23. In FIG. 1, 25 is an ITO film as a display electrode, 26 is a glass substrate, and 27 is a spacer.

An ECD 20 of this embodiment thus prepared shows good coloring when about 2.5 V is supplied by a DC electric power source 29. The response rate is as fast as a few msec, the repetition life is improved to be $10^8$ times or more, and the temperature range for use is between $-30°$ and $85°$ C. For comparison, an ECD having an electrolyte layer of 1 mol electrolyte liquid of lithium chlorate (LiClO$_4$) added with propylene carbonate is produced; the other conditions except the electrolyte layer are the same as the above-mentioned embodiment. The response rate of the ECD is 100 msec, the repetition life is 10$^6$ times or less, and the color deposition is remarkable. The temperature range for use is between $-20°$ and $70°$ C. When the ECD 20 is compared with this example for comparison, the response rate is improved by one order, and the repetion life is improved by one or two order.

In the example shown in FIG. 1, the EC layer 24 is prepared with the vacuum deposition process. On the other hand, it is also possible to prepare the EC layer 24 with the plasma polymerization of monomers of organic compounds of for example metal phthalocyanine generated by thermal sublimation. In this case, $Ar+CF_4$ can be used as the carrier gas (other halogen-containing gases for dry etching are also applicable instead of CF$_4$.)

The same plasma polymerization apparatus can be used both when this kind of EC layer 24 is formed on the macromolecular solid electrolyte layer 23 with the plasma polymerization process, and when the macromolecular solid electrolyte layer 23 of this embodiment is formed on this kind of EC layer 24. Therefore, the production processes can be simplified largely.

Prior art ECDs have not been used widely in practical uses because of the problems of the response rate and the repetition life. That is, both coloring response rate at the contact interface between the EC layer and the ion injection part (a liquid or solid electrolyte layer) and the ionic mobility in the electrolyte layer are slow, and the coloring deteriorates because the Joule heating due to the supplied current accelerates the chemical reaction so as to cause color deposition. On the contrary, an ECD of this embodiment has a macromolecular solid electrolyte produced with the plasma polymerization process as the electrolyte layer, so that the ionic mobility is improved and the chemical deposition due to the supplied current can be prevented effectively.

The ionic mobility is supposed to be improved by following reasons. In a macromolecular solid electrolyte, ions of alkali metals (for example Li$^+$) are attracted electrostatically by elements having larger electronegativity (for example oxygen) or such elements in polar groups such as an ether. The electrostatic attractive force between positive and negative ions in this electrolyte is weakened than in ordinary electrolyte liquid (for example Li$^+$ in LiClO$_4$) so that the ions are easier to move. Further, the alkali metals can be taken into polymers more effectively by using the plasma polymerization process. Still further, the degree of the bridge formation of a film deposited with the plasma polymerization apparatus of the induction type is smaller than that with an apparatus of the capacitance coupling type. Then, the structure itself has a flexible net structure to some extent so that the density of the alkali metals increases.

Though, an apparatus of the induction coupling type as shown in FIG. 2 is used in this embodiment, that of the capacitance coupling type may also be adopted. However, in the latter case, it is necessary for example to diffuse radicals of neutral species gradually to a substrate for example by floating the substrate electrically.

The deterioration of coloring is caused by the fixing of stable compounds at the interface between the solid phase in the reference example and the liquid phase. The stable compounds are generated by the chemical reactions of ionic species because such reactions become violent at the interface while the Joule heating due to the current accelerates chemical reactions (coloring reactions). On the contrary, in this embodiment the generation of the Joule heat is supposed to be suppressed because the electrical conductivity becomes smaller than that in the reference example. Further, the interface exists mainly between solid phases so that the chemical reactions do not become violet. Thus, the color deposition is not considered to happen.

An ECD of this embodiment can be made thin easily because material gas can be polymerized in place and the thickness of a film can be controlled only with the deposition time. On the contrary, a usual polymer film is formed with for example a dipping or spray process. Then, a film can be thinned as thin as a few hundreds to a few $\mu$m by using a binder which lowers the viscousity considerably and dilutes the polymer. This makes the absolute amount of polar groups and alkali metals in a film decrease because the amount of the solvent component and the binder is large.

Further, a plasma polymerization film is generated due to chemical bonds in contrast to a deposition film generated by the physical and chemical deposition. Thus, a film has advantages that the properties of a film itself is strong and that the film has good moisture resistance, heat resistance, oxidation resistance and the gas resistance or it is hard to be affected by environment.

The ECD of this embodiment shown in FIG. 1 is of the transmission type. However, an ECD of the reflection- type wherein for example a white background material is put between a display electrode and a counter electrode may also be included in the scope of the invention which does not depart from the spirit of this invention.

Figure 3:
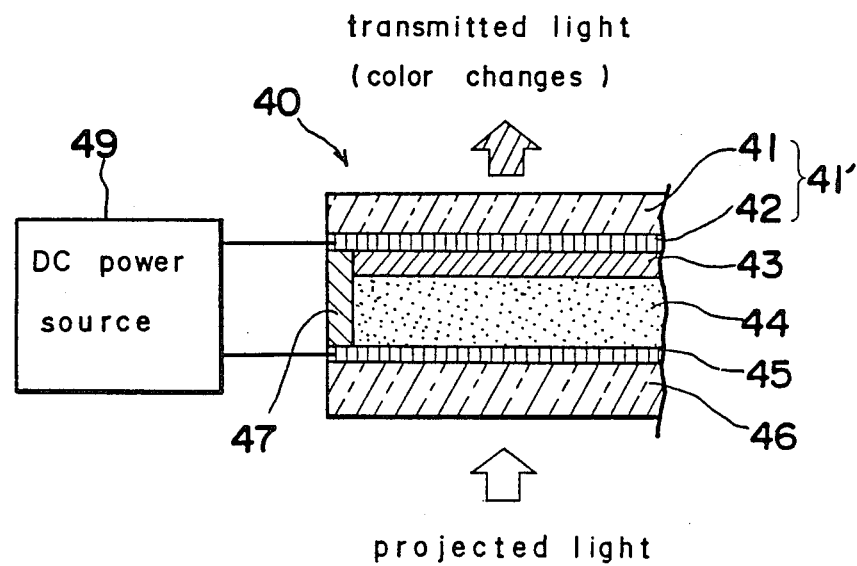
FIG. 3 is a schematic partial cross-section of an electrochromic display device of an embodiment of the present invention.

Next, embodiments of an ECD according to the invention having a coloring layer (EC layer) 44 made from organic material of the ion injection type will be explained in the following:

FIG. 3 shows a schematic cross-sect of the electrochromic display 40 of an embodiment according to the present invention. An indium-tin-oxide (ITO) electrode film 42 is applied on a glass substrate 41 or a NESA glass substrate. Then, an electrolyte layer 43 is formed on the ITO electrode film 42 with a plasma polymerization process. The EC layer 44 is made from organic material of the ion injection type, as will be explained in detail below, applied on the macromolecular electrolyte layer 43. Then, another substrate 46 to which another ITO film 45 is applied arranged so as for the other ITO film 45 to contact the EC layer 44. A spacer 47 is arranged at the side of the ECD 40 between both ITO electrode layers 42, 45. A direct-current electric power supply 49 which can change the polarity of the supplied electric voltage is connected between the electrodes 42, 45.

The organic material used for the preparation of the EC layer 44 is a phthalocynine compound, and the coloring layer is prepared with a plasma polymerization process, wherein the plasma is formed with an electric power of low frequency from 1 kHz to 3 MHz under the supply of carrier gas.

A phthalocyanine compound used as an electrochromic material may be either a known phthalocyanine or its derivative. To be concrete, the central metallic atom may be copper, silver, berylium, magnesium, calcium, gallium, zinc, cadmium, barium, mercury, aluminium, indium, lanthanum, neodymium, samarium, europium, gadolinium, dysprosium, holmium, sodium, lithium, ytterbium, lutetium, titan, tin, hafnium, lead, thorium, vanadium, antimony, chromium, molybdenum, uranium, manganese, iron, cobalt, nickel, rhodium, palladium, osmium, platinum or others. The central core of phthalocyanine may be not a metallic atom, but a metal halide which has three or more of the atomic valence. Further, a phthalocyanine derivative may also be used such as copper-4-aminophthalocyanine, iron polyhalophthalocyanine or cobalt hexaphenylphthalocyanine, or further a phthalocyanine derivative having no metallic atom such as tetraazophthalocyanine, tetramethyl phthalocyanine or dialkylamino phthalocyanine. These phthalocyanines may be used individually or to be blended.

A composition of phthalocyanine materials may also be adopted which is prepared by mixing a phthalocyanine derivative wherein one or more hydrogen atoms in one or more benzene nuclei in a phthalocyanine molecule is substituted by at least one kind of electron-attractive groups selected among a nitro group, a cyano group, a halogen atom, a sulfonic group and a carboxyl group with at least one kind of non-substituted phthalocyanine compound selected among phthalocyanines and phthalocyanine compounds mentioned above, and further with an inorganic acid which can form a salt with them, and by precipitating the composition with water or a basic material. In this case, the phthalocyanine derivatives substituted with an electron attractive group may have substituted groups of any number between one and sixteen in an molecule. Further, the ratio of the composition of the number of the substituted groups in the phthalocyanine derivatives to a phthalocyanine molecule unit in the composition is between 0.001 and 2, preferably between 0.002 and 1. The inorganic acid to be used on the preparation of the phthalocyanine composition may be sulfuric acid, orthophosphoric acid, chlorosulfonic acid, chloric acid, hydroiodic acid, hydrofluoric acid or hydrobromic acid.

The coloring layer 44 is prepared with a plasma polymerization process at a low frequency between 1 kHz and 3 MHz under the supply of carrier gas.

The carrier gas is selected among a group of oxygen gas, nitrogen gas, hydrogen gas, chlorine gas, inert gas such as argon, carbon halide gas and halide gas. The carbon halide gas may be a gas of $CCl_4$, $CF_4$, $C_2F_6$, $C_3F_8$ or $C_4F_8$. The halide gas may be a sulfur halide such as $SF_6$ gas, a nitrogen halide such as $NF_3$ gas, or a gas of general formula $C_lF_mX_n$ (where X is a halogen element except fluorine) such as $CF_3Cl$, $CF_2Cl_2$, $C_2F_5Cl$, $CF_3Br$, $CF_4+Cl_2$ or $CF_4+I_2$ ("+" means a mixture.). Such a gas as $CHF_3$, $CClF_3$, $CBrF_3$, $BCl_3$ or $SiCl_4$ may also be adopted.

An apparatus used for the plasma polymerization is preferably that of the capacitance coupling type, especially having parallel plate electrodes. An apparatus of the induction coupling type may also be applied in some conditions.

The conditions of the plasma polymerization is as follows: The gas pressure for the glow discharge is for example between 0.01 and 3.0 Torr. The frequency of the alternating electric field is selected in a low frequency range between 1 kHz and 3 MHz, preferably between 5 kHz and 500 kHz. The lower limit of the frequency range is determined both from the quality of the growth of a film affected by the unevenness of the discharge on the plasma polymerization and from the homogeneity of the coloring. On the other hand, the upper limit is restricted by an ability for ions to follow the alternating electric field or by the response rate of the coloring layer, that is, by the quality of the formation of very fine network structure due to the effect of the bombardment of the ions. The temperature of the substrate 41 on which the coloring layer 44 is formed may be left to be at room temperature. The temperature of the substrate 41 may be controlled at a temperature or in a temperature range, but the temperature increases due to the energy of the plasma itself. Then, temperature of the substrate 41 is generally kept at a temperature in correspondence to the power used for the generation of the plasma.

Figure 4:
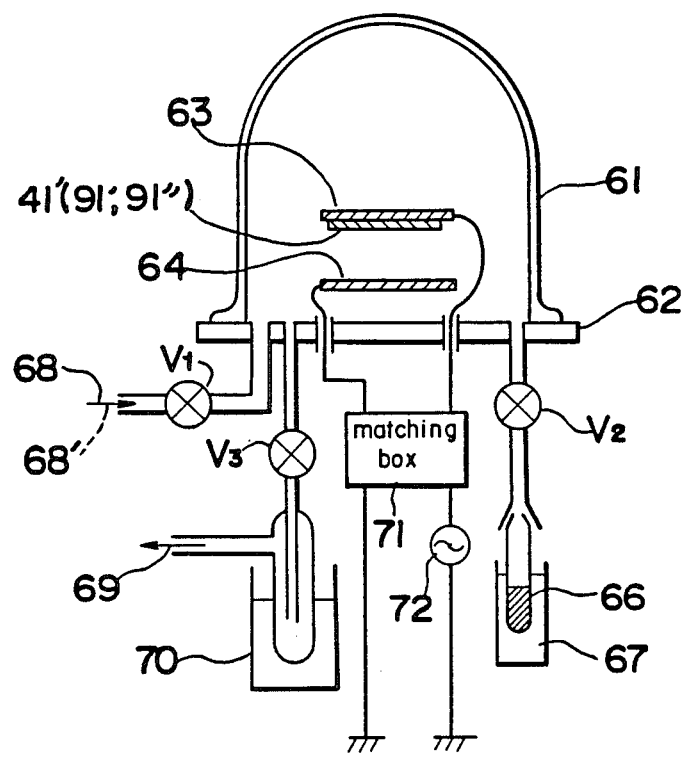
FIG. 4 is a schematic cross-section of a plasma polymerization apparatus.

FIG. 4 shows a cross-sect of a plasma polymerization apparatus of the parallel plates type, wherein 61 designates a bell jar which is placed airtight on a metallic base plate 62. Parallel plate electrodes which consist of an upper plate 63 and a lower plate 64 are set in the bell jar 61. A glass substrate 41 or a NESA glass substrate on which a transparent electrode 42 such as ITO is fixed on the upper electrode 63. EC material 66 of phthalocyanine to be formed as a film on the substrate 41 is sublimed by heating it with a temperature controller 67 and is vaporized as monomers, and the monomers are introduced into the bell jar 61 via a valve $V_2$. Carrier gas 68 such as Ar gas or $CF_4$ gas is also introduced into the bell jar 61 via a valve $V_1$ synchronously with the above-mentioned introduction of the EC material gas.

The bell jar 61 is evacuated with a vacuum pump 69 by opening a valve $V_3$. The EC material exhausted at the evacuation is deposited at a cold trap 70. The degree of the vacuum is measured with a vacuum gauge not shown, and the gas pressure is kept for the glow discharge at about 0.05 to 0.1 Torr or at 0.05 to 2.0 Torr according as the carrier gas 68 is Ar gas or $CF_4$ gas. The alternating electric field to be generated between the parallel plate electrodes 63, 64 is applied by a low frequency electric power source 72 via a matching box 71. The low frequency electric power source 72 is of a type wherein the frequency can be varied. In the embodiments, frequencies of 50 kHz, 1 MHz, 3 MHz and 5 MHz are adopted, while those of 13.56 MHz and 500 Hz are applied for comparison.

Typical conditions are as follows if the carrier gas 68 is Ar gas: Electric power source is 30 W, discharge frequency is 50 kHz, the flow rate is 0–20 sccm, the gas pressure is 0.05 to 0.1 Torr, and the substrate 65 is not heated at room temperature. The EC materials 66 of phthalocyanine is α-chlorinated copper phthalocyanine comprising four chlorine atoms at para sites. The ITO film 42 on the substrate 41 is connected to the ground.

Differences in typical conditions are as follows if the carrier gas 68 is $CF_4$ gas: The flow rate of carrier gas is 40 to 60 sccm, the gas pressure 0.1 to 0.3 Torr, and the EC material 66 of phthalocyanine is lutetium diphthalocyanine.

Monomers of EC material 66 and carrier gas 68 are introduced in the bell jar 61, and ac electric field of low frequency 50 kHz is applied between the parallel plate electrodes 63, 64. Then, molecules are ionized by free electrons in the gas accelerated by the electric field, and plasma gas having an electrically conductive property is generated. The plasma gas comprises various excited species such as electrons, ions and radicals. However, this system is in the low temperature plasma state, the chemical species are not subjected to thermal damage relatively, and additive chemical reactions proceed from excited species such as radical species. Because the discharge frequency is chosen as low as 50 kHz, various ionic species which include Ar ions among various species generated in the plasma move alternately between the upper and lower electrodes 63, 64. The moving ionic species attack a thin film which is growing on the substrate 64 in the plasma polymerization process. Thus, the polymerization film grows under the existence of ionic bombardment, and this affects the structure of the film largely. That is, a film itself has a very fine network structure affected by the high temperature and the high pressure at microscopic parts due to ionic bombardments, while keeping the strong polymerization property due to three-dimensional bridging.

On the contrary, if the discharge frequency is less than 1 kHz (for example 50 Hz to 1 kHz), charges of ionic species generated in the plasma are charged up on a film or near the electrode so as to form an ionic sheath (sheath electric field) of DC electric field when a film grows with the glow discharge process. This may cause anomalous discharge or stops continuous discharge. That is, a film does not grow practically.

On the other hand, if the discharge frequency is 3 MHz or more, the ionic species in the plasma cannot follow the change in the alternating electric field practically so that the effect of ionic bombardment cannot be expected. Then, a plasma polymerization film has a very fine structure.

EC layers are prepared at various discharge conditions for ECDs of a cross-sect of a common structure shown in FIG. 3.

which act as the electrodes 42, 46 effectively is about 0.05 μm.

The ECD 40 of an embodiment (A2) prepared as mentioned above by using α-chlorinated copper phthalocyanine at the discharge frequency 50 kHz shows good EC characteristics. That is, the coloring layer 43 shows a green color, while the color changes for a color from blue to cobalt when $-2$ V of DC voltage is applied. The response rate is about 3 msec, the repetition times is $10^7$ to $10^8$ times, and the temperature range for use is between $-30°$ to $80°$ C. all the items on the EC characteristics are good.

Another ECD (C2) 40 prepared as mentioned above by using lutetium phthalocyanine at the discharge frequency 50 kHz shows good EC characteristics. That is, the coloring layer 43 shows a green color, while the color changes for red when $-2$ V to $+2$ V of DC voltage is applied. The response rate is about 10 msec, the repetition times is $10^7$ to $10^8$ times, and the temperature range for use is between $-30°$ to $80°$ C. Thus, all the items on the EC characteristics are good.

The improvements, especially of the response rate and the coloring property, of both embodiments are ascribable to the above-mentioned fine net structure of the coloring layer 43. The structure has many fine pores not only at the interface with the electrolyte layer 44 but also in the bulk of the coloring layer, and ions ($Li^+$) in the electrolyte liquid pass through the fine pores so that the contact area of the coloring layer 23 with the ions increase remarkably.

TABLE 1

| EC properties | COMPARISON (B) 500 | EMBODIMENTS | | | | | COMPARISON A6 13.56 M |
|---|---|---|---|---|---|---|---|
| | | A1 1 K | A2 50 K | A3 1 M | A4 3 M | A5 5 M | |
| | | freq. (Hz) | | | | | |
| response rate | (Δ) | ⊙ | ⊙ | ○ | Δ | X | X¹ |
| reliability (life) | (Δ) | ⊙ | ⊙ | ⊙ | ⊙ | ○ | — |
| coloring | (Δ) | ⊙ | ⊙ | ⊙ | ○ | Δ | X |
| temperature range (°C.) | (−10-50) | −30-80 | −30-80 | −30-80 | −30-80 | −30-80 | −30-80 |
| quality of crystal growth | (⊙) | Δ | ○ | ○ | ○ | ⊙ | ⊙ |
| homogeneity of color | (○) | Δ | ○ | ○ | ○ | ⊙ | ⊙ |
| remarks | 2 | 3 | | | | 4 | 5 |

⊙ ... excellent
○ ... good
Δ ... fair
X ... bad
¹The sample has nearly no electrochromism.
²Charge up happens on the deposition to cause anomalous discharge.
³The unevenness of discharge happen to affect the quality and the homogeneity of a film.
⁴The sample is inferior in electrochromism.
⁵Though the quality of the crystal growth is good, nearly no electrochromism is observed.

The electrolyte liquid which constitutes the electrolyte layer 44 may be an aqueous solution of for example $KC_1$, $NaClO_4$, $KClO_4$, $LiClO_4$, $K_2SO_4$, $Na_2SO_4$ or $Li_2SO_4$. In this embodiment, 1 mol aqueous solution of $LiClO_4$ is adopted.

The thickness of the coloring layer 43 is between 0.1 and 10 μm, preferably between 1 and 7 μm. If the thickness is less than 1 μm, the contrast on coloring is not sufficient, while if the thickness is larger than 7 μm, the change in color becomes dull considerably. If the thickness is between the above-mentioned range, the contrast is sufficient and the change in color becomes sharp when a bias voltage is applied. The thickness of ITO electrodes 42, 46 is between 0.03 and 0.5 μm, preferably between 0.05 and 0.1 μm. The lowest thickness of films Table 1 compiles the data on the EC properties such as the response rate, the reliability (the repetition life), the coloring, the temperature range for use, the growth of a film, the homogeneity of color and remarks if any of several embodiments A1–A5 and comparisons A6, B. The samples have a coloring layer made from α-chlorinated copper phthalocyanine. They are all prepared at the same conditions except the discharge frequency.

It is found that the sample A2, the most favorable sample explained above, is the best as a whole. On the other hand, a sample A1 prepared at frequency 1 kHz is excellent in EC properties such as the reponse rate, but fair for the film growth and the homogeneity of color because the discharge is not even. A sample A5 prepared at the frequency 5 MHz is bad for the response rate and fair for the coloring, while excellent for the film growth and the reliability. A sample A6 prepared at frequency 13.56 MHz show almost no EC.

In contrast to those embodiments, a film cannot be prepared at the discharge frequency 500 Hz due to the anomaluos discharge or the stop of discharge on the growth of a film. Then, the coloring layer of an ECD 40 of sample B for comparison is prepared with the vacuum deposition process. This sample B is found to change its color to a color ranging from blue to cobalt when −2 V of a DC voltage is applied, but its coloring is weak, the response rate is about 100 msec, the repetition times is $10^6$ to $10^7$ times and the temperature range becomes narrower to a range from −10° to 50° C. The properties of the film are shown with parentheses in Table 1.

to a range from −10° to 50° C. The properties of a film are shown with parentheses in Table 2.

A film prepared with the vacuum deposition process grows on a substrate, having an island structure, so that voids exist between crystal grains, and this structure allows ions of the electrolyte defuse so as to make them active electrochemically.

On the other hand, a plasma polymerization film has a firm and compact film structure due to the polymerization accompanied by bridging, so that it is inactive electrochemically in general. Further, a plasma polymerization film according to the present invention has fine pores so that ions of the electrolyte can penetrate in the film.

Still further, a plasma polymerization film according to the present invention keeps the chemical stability even when the chemical reaction at the interface with the electrolyte layer becomes vigourous due to the Joule heating because the film itself is firm and compact.

TABLE 2

| EC properties | COMPARISON (D) 500 | EMBODIMENTS freq. (Hz) | | | | | COMPARISON |
|---|---|---|---|---|---|---|---|
| | | C1 1 K | C2 50 K | C3 1 M | C4 3 M | C5 5 M | C6 13.56 M |
| response rate | (Δ) | ⊚ | ⊚ | ○ | Δ | X | X[1] |
| reliability (life) | (Δ) | ⊚ | ⊚ | ⊚ | ⊚ | ○ | — |
| coloring | Δ | ⊚ | ⊚ | ⊚ | ○ | Δ | X |
| temperature range (°C.) | (−10–50) | −30–80 | −30–80 | −30–80 | −30–80 | −30–80 | −30–80 |
| quality of crystal growth | (⊚) | Δ | ○ | ○ | ○ | ⊚ | ⊚ |
| homogeneity of color | (○) | Δ | ○ | ○ | ○ | ⊚ | ⊚ |
| remarks | 2 | 3 | | | | 4 | 5 |

⊚ . . excellent
○ . . . good
Δ . . . fair
X . . . bad
[1]The sample has nearly no electrochromism.
[2]Charge up happens on the deposition to cause anomalous discharge.
[3]The unevenness of discharge happen to affect the quality and the homogeneity of a film.
[4]The sample is inferior in electrochromism.
[5]Though the quality of the crystal growth is good, nearly no electrochromism is observed.

Similarly, Table 2 compiles the data on the EC properties of several embodiments C1–C5 and comparisons, both having a coloring layer made from lutetium phthalocyanine. They are all prepared at the same conditions except the discharge frequency.

It is found that the sample C2, the most favorable sample explained above, is the best as a whole. On the other hand, a sample C1 prepared at frequency 1 kHz is excellent is EC properties such as the response rate, but fair for the film growth and the homogeneity of color because the discharge is not even. A sample C5 prepared at the frequency 5 MHz is bad for the response rate and fair for the coloring, while excellent for the film growth and the reliability. A sample C6 prepared at frequency 13.56 MHz show almost no EC.

In contrast to those embodiments C1–C5, a film cannot be prepared at the discharge frequency 500 Hz due to the anomalous discharge or the stop of discharge on the growth of a film. Then, the coloring layer of an ECD 40 of sample D for comparison is prepared with the vacuum deposition process. This sample is found to change its color to red when −2 V to +2 V of DC voltage is applied, but its coloring is weak, the response rate is about 50–100 msec, the repetion times is $10^6$ to $10^7$ times and the temperature range becomes narrower Therefore, the coloring is improved and the repetition life is extended.

The embodiments mentioned above are prepared by putting a substrate 41' on the upper electrode 63 in the apparatus shown in FIG. 4. However, an ECD is also prepared by putting a substrate 41' on the lower electrode 64.

Figure 5:
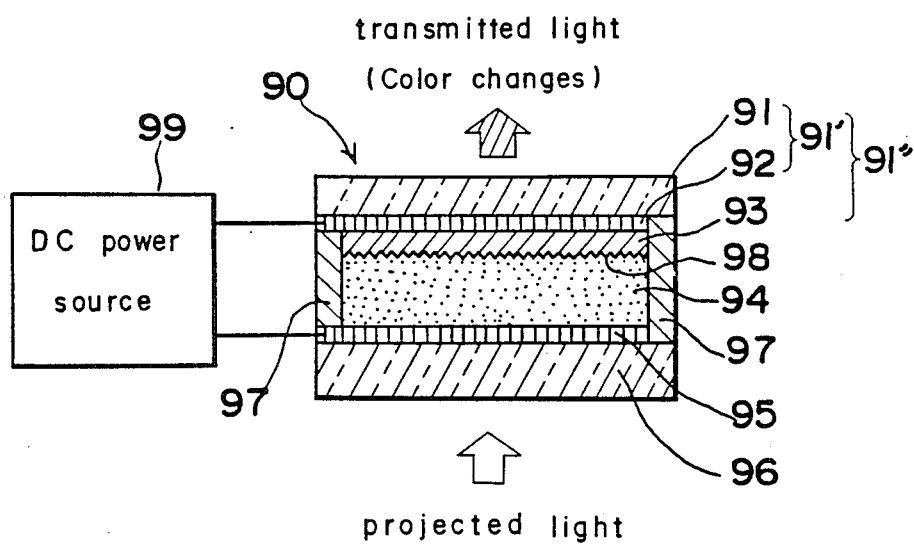
FIG. 5 is a schematic cross-sect of an electrochromic display device of an embodiment of the present invention.

Next, an ECD 90 having a coarsened interface 98 between an electrochromic layer 94 and an electrolyte layer 93 according to an embodiment of the present invention will be explained. FIG. 5 shows a schematic cross-sect of an electrochromic display 90 of an embodiment according to the present invention. An indium-tin-oxide (ITO) electrode film 92 ia applied on a glass substrate 91 or a NESA glass substrate. Then, a coloring layer 93 is formed on the ITO electrode film 92 with a plasma polymerization process. An electrolyte layer 94 is 1 mol aqueous solution of $LiClO_4$. Then, another substrate 96 to which another ITO film 95 is applied is arranged so as for the other ITO film 95 to contact the electrolyte layer 94. A spacer 97 is arranged at the side of the ECD 90 between both ITO electrode layers 92, 95. A direct-current electric power supply 99 which can change the polarity of the supplied electric voltage is connected between the electrodes 92, 95.

The coloring layer 93 is made of an organic electrochromic material which may be an organic compound, a mixture of organic and inorganic compound, or an organometllic compound, preferably a phthalocyanine compound mentioned above.

A process for forming an electrochromic layer 93 from the electrochromic material may be a coating process, a vacuum deposition process or a sputtering process, or preferably a plasma polymerization process under the supply of carrier gas in predetermined conditions.

The coarsening of the interface 98 is processed preferably under the action of the bombardment of the plasma of halide gas on the surface of the above-mentioned electrochromic layer 93.

The halide gas is preferably a compound which include one or more of carbon, nitrogen or sulfur, or preferably, fluorine or chlorine, or most preferably a gas for reactive ion etching such as $CF_4$, $NF_3$, $SF_6$ or $CCl_4$. Other gases such as $H_2$, He, $N_2$, $Cl_2$ or Ar may also be applicable in conditions depending on the length of the reaction time.

Next, the coarsening of the interface 98 will be explained in the following: An EC layer 93 of lutetium diphthalocyanine has been formed with plasma polymerization process at the discharge frequency of 50 kHz on a NESA glass substrate 91' covered by an ITO film 92. Then, this substrate 91" is fixed on the upper electrode 63 in an apparatus shown in FIG. 4. The frequency on the RF electric power source 72 is set to be 13.56 MHz, and the supplied power is set to be 50 W. Next, $NH_3$ gas 68' is supplied in the bell jar 61 through the valve V1, instead of the carrier gas 68 used in the above-mentioned embodiments. The substrate 91" is not heated (at room temperature), and the pressure in the bell jar 61 is kept at 0.2 Torr. Then, the plasma of $NH_3$ gas 68 is generated between the parallel plate electrodes 63, 64, and the plasma moves vigourously between the plates 63, 64. The surface of the substrate 91", that is, the surface of the EC layer 93 is bombarded by the plasma. This plasma bombardment is kept during about twenty minutes.

A number of very fine irregularities are formed on the surface of the EC layer 93 by the plasma bombardment. It is thought that the bombardment of ions acts intensely on points where bondings between carbon atoms are weak and breaks the surface sharply inside to form irregularities. Thus, the surface of the EC layer 93 becomes a coarse plane 98 as shown schematically in FIG. 5.

The gas for coarsening the surface of the EC layer 93 may be $CF_4$, $SF_6$ or $CCl_4$. It may also be $H_2$, He, $N_2$, $Cl_2$ or inert gas such as Ar. However, if a gas of a smaller atomic number is adopted, the effect of coarsening the surface by the plasma is smaller so that the coarsing need a rather longer time.

If oxygen is adopted, such an effect can be expected to some extent for a coloring layer of an inorganic material such as $WO_3$. On the contrary, ashing happens for a coloring layer of organic material by the oxygen plasma so as to decompose to $CO_2$ gas. Further, even if the conditions are restricted to coarsen the surface weakly so as to prevent the decomposition, the coloring layer near the surface changes in quality chemically, and EC characteristics, especially the coloring, deteriorates. Thus, oxygen gas cannot be adopted for a coloring layer of organic material.

In FIG. 5, layers 91–97 as well as their thickness are similar to those in FIG. 3. The electrolyte 94 is 1 mol aqueous solution of $LiClO_4$. The surface 96 of the EC layer 93 which contacts with the electrolyte liquid is thought to increase a few times that shown in FIG. 3. Therefore, the reaction rate on the application of a voltage is expected to increase largely.

When the DC voltage of $-2$ to $+2$ V is applied to an ECD according to this embodiment with increase in the value of the applied voltage, the color changes successively from blue to red, the coloring is sharp, and the color changes sensitively due to a change in the applied voltage. The response time and the repetition times are good to be 2–3 msec and $8.4 \times 10^7$ times, respectively. Table 3 summarizes the EC characteristics of this embodiment as well as those of a comparison sample and a prior art (C6 in Table 2). The comparison sample is the same as samples C1 to C5 in Table 2 (FIG. 3). It is found that the sample C6 nearly show EC characteristics whereas these comparison samples C1 to C5 show EC characteristics to some extent though not so good to be used practically. Thus, the effectiveness of the coarsening of the interface is shown clearly.

TABLE 3

| | EXAMPLE | | |
|---|---|---|---|
| EC property | EMBODIMENT | COMPARISON | PRIOR ART |
| response rate (msec) | 2–3 | about 10 | 50–100 |
| repetition life (times) | $8.4 \times 10^7$ | $3.2 \times 10^7$ | $10^6$–$10^7$ |
| contrast | sharp | fair | dull |

In the embodiments mentioned above, substrates 41, 91 are put on the upper electrode 63 of the parallel plate electrodes, but they can also be put on the lower electrode 64. No difference of the effects are found.

Though the electrolyte layer 94 is a liquid in the embodiments mentioned above, it may also be a solid, which include a sol-like material. If the electrolyte layer is a solid, the surface of the electrolyte layer (that is, the interface with the coloring layer) may be coarsened beforehand so that the coloring layer can be formed on the coarsened surface.

The coloring layer 93 is prepared with the plasma polymerization in the preferable embodiments, but the effect of the coarsening of the interface is not limited to the coloring layer 93 formed by the plasma polymerization. It is also effective for a coloring layer prepared with a coating process, a vacuum deposition process or a sputtering process.

The preferred embodiments described herein are illustrative and not restrictive, the scope of the invention being indicated by the appended claims and all variations which come within the meanings of the claims are intended to be embraced herein.

What is claimed is:

1. An electrochromic display device, comprising:
a first transparent electrode, an electrochromic layer, a macromolecular solid electrolyte layer and a second electrode, each applied successively, being characterized in that
the macromolecular solid electrolyte layer is a plasma polymerization film which includes a hydrocarbon compound, an alkali metal and an element having large electronegativity.

2. An electrochromic device according to claim 1, wherein said element having large electronegativity is selected from the group consisting of fluorine, oxygen, nitrogen and chlorine.

3. An electrochromic device according to claim 1, wherein said alkali metal is selected from the group consisting of lithium, sodium, pottasium, rubydium and cesium.

4. An electrochromic device according to claim 1, wherein said macromolecular solid electrolyte layer is formed by a plasma polymerization process from materials of at least a hydrocarbon compound having an alkali metal and an organic compound having an element of large electronegativity.

5. An electrochromic device according to claim 2, wherein a material for providing the plasma polymerization film with said element of large electronegativity is an organic compound including said element of large electronegativity.

6. An electrochromic device according to claim 2, wherein a material for providing the plasma polymerization film with said element of large electronegativity is an inorganic compound including said element of large electronegativity.

7. An electrochromic device according to claim 3, wherein a material for providing the plasma polymerization film with the alkali metal is one selected from the group consisting of a metallic element, organometallic compound, metal hydride, metal azide, metal amide and alkoxide which include said alkali metal.

8. An electrochromic device according to claim 1, wherein said hydrocarbon is a compound selected from the group consisting of saturated hydrocarbons, unsaturated hydrocarbons, alicyclic hydrocarbons and aromatic hydrocarbons.

* * * * *